(12) United States Patent
Thiel et al.

(10) Patent No.: US 9,888,344 B2
(45) Date of Patent: Feb. 6, 2018

(54) TECHNIQUES FOR MULTIPLE PASS GEOLOCATION

(71) Applicant: Viavi Solutions UK Limited, Berkshire (GB)

(72) Inventors: Stefan Ulrich Thiel, Newbury (GB); Gareth James Smith, Newbury (GB); Christopher Michael Murphy, Bath (GB); Peter Kenington, Chepstow (GB); Howard John Thomas, Stonehouse (GB)

(73) Assignee: Viavi Solutions UK Limited, Berkshire (GB)

( * ) Notice: Subject to any disclaimer, the term of this patent is extended or adjusted under 35 U.S.C. 154(b) by 101 days.

(21) Appl. No.: 14/451,931

(22) Filed: Aug. 5, 2014

(65) Prior Publication Data

US 2016/0044455 A1 Feb. 11, 2016

(51) Int. Cl.
*H04W 24/00* (2009.01)
*H04W 4/02* (2009.01)
*H04L 12/26* (2006.01)
*G01S 5/02* (2010.01)

(52) U.S. Cl.
CPC .......... *H04W 4/021* (2013.01); *G01S 5/0263* (2013.01); *H04L 43/0864* (2013.01)

(58) Field of Classification Search
CPC .............................. H04W 4/021; G01S 5/0263
USPC ................................ 455/456.1, 404.1, 404.2
See application file for complete search history.

(56) References Cited

U.S. PATENT DOCUMENTS

| | | | |
|---|---|---|---|
| 8,165,599 B1 | 4/2012 | Dronamraju et al. | |
| 8,195,200 B2* | 6/2012 | Mohi | G01C 21/20 455/456.1 |
| 8,374,596 B2 | 2/2013 | Thiel et al. | |
| 2011/0319093 A1 | 12/2011 | Flanagan | |
| 2013/0143585 A1* | 6/2013 | Kenington | G01S 5/0252 455/456.1 |
| 2013/0210449 A1 | 8/2013 | Flanagan | |
| 2013/0210450 A1 | 8/2013 | Kenington et al. | |

(Continued)

FOREIGN PATENT DOCUMENTS

EP 2 237 527 A1 10/2010
WO 2004/023155 A1 3/2004

OTHER PUBLICATIONS

Extended European Search Report corresponding to EP Application No. 15 17 9396, dated Jan. 5, 2016, 8 pages.

*Primary Examiner* — Chuck Huynh
(74) *Attorney, Agent, or Firm* — Harrity & Harrity, LLP

(57) ABSTRACT

Techniques for multiple pass geolocation are disclosed. In one particular exemplary embodiment, the techniques may be realized as a system for multiple pass geolocation. The system may comprise one or more processors communicatively coupled to a mobile communications network. The one or more processors may be configured to conduct a first geolocation pass to identify one or more geolocation estimates under consideration. The one or more processors may also be configured to conduct at least one additional geolocation pass to refine one or more geolocation estimates under consideration. The one or more processors may further be configured to determine an approximate location of one or more mobile devices within an estimated coverage area of a network based on at least the first geolocation pass and the at least one additional geolocation pass.

23 Claims, 11 Drawing Sheets

(56) References Cited

U.S. PATENT DOCUMENTS

| | | | | |
|---|---|---|---|---|
| 2013/0217418 A1* | 8/2013 | Maurin | ................... | H04W 4/02 455/456.3 |
| 2013/0344900 A1 | 12/2013 | Allegra et al. | | |
| 2014/0171102 A1 | 6/2014 | Murphy et al. | | |
| 2014/0171103 A1 | 6/2014 | Murphy et al. | | |
| 2015/0211845 A1* | 7/2015 | Le Grand | ............... | H04W 4/02 702/150 |

\* cited by examiner

TECHNIQUES FOR MULTIPLE PASS GEOLOCATION

TECHNICAL FIELD

The present invention relates to a wireless telecommunications system, and more particularly, to techniques for multiple pass geolocation within a wireless telecommunications system.

BACKGROUND

Mobile communication devices, such as smart phones, tablets, and other electronic hand-held devices, are becoming increasingly popular. Although mechanisms exist to locate mobile devices within a wireless telecommunications system, such mechanisms suffer significant inaccuracies. For example, a conventional location mechanism may typically report an approximate location selected at random from a range of possible locations. When multiple location mechanisms are combined with hopes of providing greater location accuracy, inconsistent location approximations may result. These results are rarely accompanied by further information regarding how to reconcile the inconsistencies or how to determine which of these approximations is more or less reliable. In view of the foregoing, it may be understood that there are significant problems and shortcomings associated with current solutions and technologies for more accurately locating mobile devices within a wireless telecommunications system.

BRIEF DESCRIPTION OF DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION

Figure 1:
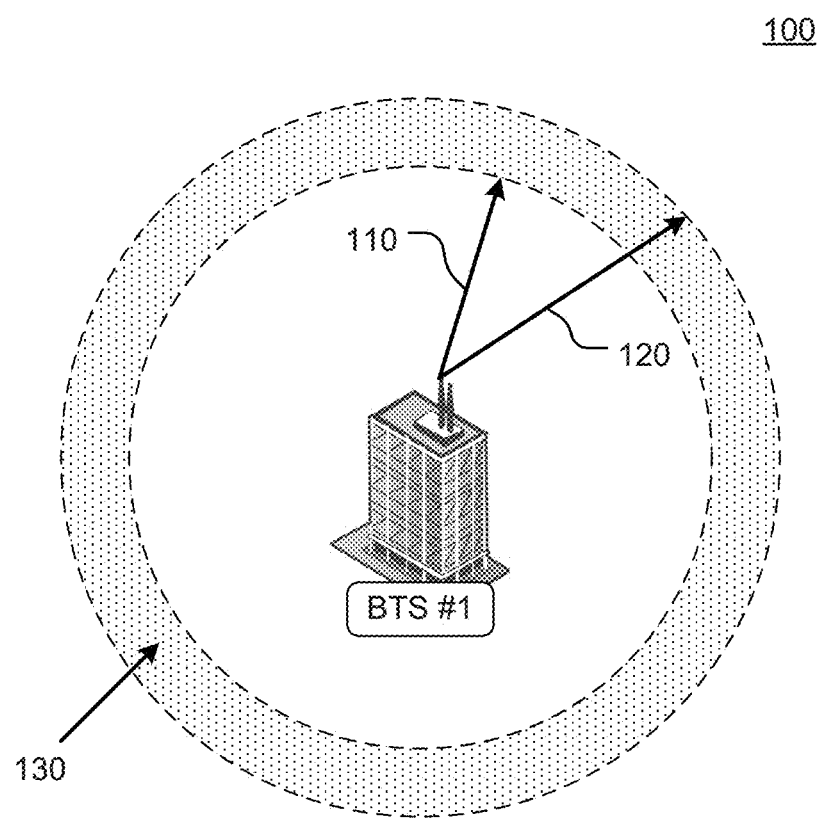
FIG. 1 illustrates a schematic diagram of a potential location range for a mobile device in a geolocation system, according to an exemplary embodiment.

Reference will now be made in detail to exemplary embodiments, examples of which are illustrated in the accompanying drawings. It should be appreciated that the same reference numbers are used throughout the drawings to refer to the same or like parts. It should be appreciated that the following detailed descriptions are exemplary and explanatory and are not restrictive.

Exemplary embodiments may provide a system and method for multiple pass geolocation. That is, exemplary embodiments may, among other things, improve accuracy for locating mobile devices within wireless telecommunication cells using multiple pass geolocation techniques.

As described above, conventional mechanisms to locate mobile devices within wireless telecommunications systems may suffer significant drawbacks. Although a mobile device equipped with a global positioning system (GPS) may provide location estimates, enabling a GPS receiver in a mobile device typically results in considerable power drain on a mobile device's battery. Another technique involves examining base stations that are visible to a mobile device and calculating an intersection of coverage footprints of base stations based upon drive-testing or data collected from previous users of the same base stations. However, this process assumes that the mobile device is somewhere within the overlap of coverage areas and may involve enabling a GPS receiver on the mobile devices which were originally used to ascertain the coverage areas of the base stations. It should also be appreciated that there are also other ways to do this without a GPS as well. Still other techniques may take into account a timing delay between a user device and a number of local base stations. For instance, the time taken for signals to propagate from the user device to each base station may provide an estimate of the distance of the user device from each base station, and hence, combined information from a number of base stations may thereby provide a set of delay contours, whose intersection(s) may provide an approximate location of the user device.

It should be appreciated that such techniques may provide an approximate location for a mobile device that is very coarse and typically entails selecting at random from a range of possible locations. For instance, if timing information is available from a single base station, at a given location/point in time, then the mobile device could be located at any point within an annular ring surrounding the base station, described in more detail herein. Without any additional information (e.g., from another base station or other source), it may be difficult to accurately predict at which point within the annular ring the mobile device is actually located.

In systems that utilize GPS, for example, uncertainty may vary from errors of less than a meter to many kilometers, depending upon factors such as the constellation of satellites, sky visibility, time available to make a location fix, and accuracy with which the location fix is conveyed from the mobile device to a network. In scenarios where multiple mechanisms are used (with hopes of generating a more reliable location approximation), what typically happens is that these mechanisms generate a host of inconsistent results and without any further information to help show which of these approximations is more or less reliable or how to weigh their relative importance of the systems and/or location results.

FIG. 1 illustrates a schematic diagram of a potential location range for a mobile device in a geolocation system, according to an exemplary embodiment. Referring to FIG. 1, diagram 100 depicts a single base station, BTS #1. When a timing-based geolocation system is used, a mobile device location may be validly reported as being within a coverage area of BTS #1, where the coverage area may be circular in shape. More specifically, a mobile device may report a measured round-trip propagation delay. In some embodiments, for example, the measured round-trip propagation delay may be N chips 110 (or other delay measurement), where each chip (or period of delay) may correspond to a predefined distance, e.g., 100 m). Assuming a direct line of sight of a signal, the mobile device may report that the round-trip propagation delay as somewhere between N chips and just under N+1 chips 120. It should be appreciated that until the delay becomes equal to, or greater than, N+1 chips, the mobile device may report a delay of N chips. Thus, the mobile device may be located anywhere within an annular ring 130, as shown in FIG. 1, created by the round-trip propagation delay of N chips 110 and N+1 chips 120. It should be appreciated, however, that a conventional geolocation system may not know precisely where, within that considerable annular ring area 130, the mobile device is located.

In reality, the timing interval may not be well-defined and errors in setting the timing advance could mean that a round trip delay may not always correspond to an actual round trip delay. A good example may be a non-line of sight signal. For instance, if the signal reaches the mobile device by bouncing off a nearby building then the reported round trip could be more than twice the actual distance between the mobile device and the base station, depending on an angle of incidence and/or an angle of reflection.

Figure 2:
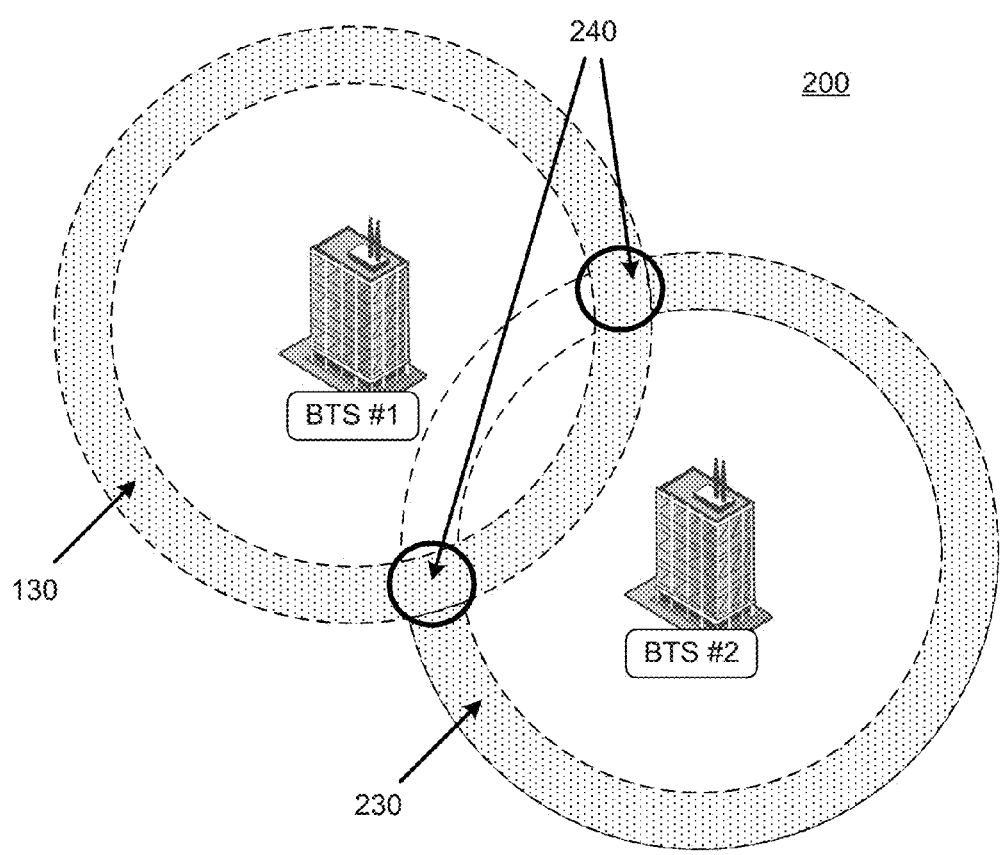
FIG. 2 illustrates a schematic diagram of potential locations for a mobile device in a geolocation system, according to an exemplary embodiment.

FIG. 2 illustrates a schematic diagram of potential locations for a mobile device in a geolocation system, according to an exemplary embodiment. Referring to FIG. 2, diagram 200 depicts two base stations. In this configuration, timing information may be available from a first base station BTS #1 (similar to BTS #1 of FIG. 1) and an approximate signal-strength-based contour may be available from a second base station BTS #2. In this configuration, a mobile device may be generally equidistant from BTS #1 and BTS #2. As a result, a distance estimate from BTS #1 (based on a number of chip periods reported as a round-trip propagation delay, N, from BTS #1) may be similar to a distance estimate range from BTS #2 (based on approximate signal strengths recorded in communications with BTS #2). It should be appreciated that the annular ring for BTS #2 may illustrate a "noise" factor, which may appear in signal strength measurements that are due to interactions with local "clutter" (e.g. from buildings, street furniture, etc.). This may introduce further uncertainty into such measurements, which in turn may, in a similar manner to uncertainties from the round-trip propagation delay measurements, impact signal strength-based distance measurements. It should be appreciated that in FIG. 2, there may be two possible regions 240 in which a mobile device could be located. While this is an improvement over the configuration illustrated in FIG. 1, there may still be a relatively large degree of uncertainty as to where a mobile device is actually located. For example, the two regions 240 may still cover several hundreds of meters or even kilometers of geographical area. If additional timing or signal strength information were available from an additional base station, with overlapping coverage areas, all covering locations of mobile devices, then the location of a mobile device's position could potentially be narrowed more, perhaps down to a relatively small area.

Figure 3:
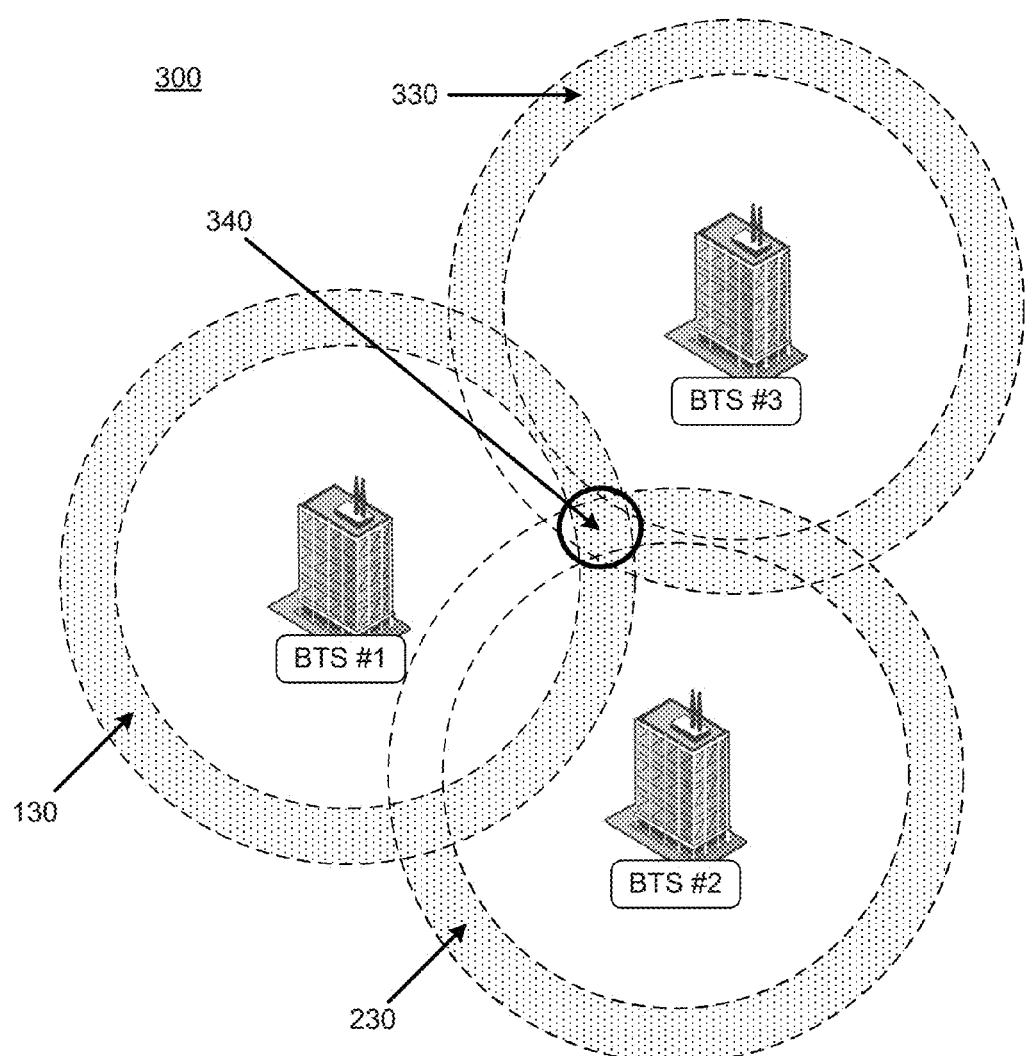
FIG. 3 illustrates a schematic diagram of potential locations for a mobile device in a geolocation system, according to another exemplary embodiment.

FIG. 3 illustrates a schematic diagram of potential locations for a mobile device in a geolocation system, according to an exemplary embodiment. Referring to FIG. 3, diagram 300 depicts three base stations. In this configuration, timing information may be available from a first base station BTS #1 (similar to BTS #1 of FIGS. 1-2) and approximate signal-strength-based contours may be available from a second base station BTS #2 and a third base station BTS #3. If additional timing or signal strength information from BTS #2 and BTS #3 were positioned such that coverage area 230 from BTS #2 and coverage area 330 from BTS #3 overlapped with timing-based coverage area 130 of BTS #1 at one intersecting region 340, then the location of a mobile device's position could potentially be narrowed more, perhaps down to such a relatively small area.

However, such a high degree of redundant coverage may be unavailable in many locations in a real network. In many instances, a real network may look more like those scenarios and configurations depicted in FIGS. 1-2. Even in diagram 300 of FIG. 3, for example, the intersecting region 340 may still have dimensions that cover several hundred square meters of area or more, in which candidate locations may still be arbitrarily placed within this area 340. And in situations where a GPS location fix is available, a shape containing the likely location may often be generated. This shape may represent a coverage area, again, of several hundred square meters or more and may further depend on other additional factors, such as the satellite constellation, visibility of the sky, etc. Again, arbitrarily many candidate locations within the shape may be considered for the location of the mobile, which may provide unreliable results.

Furthermore, when some combination of one or more of signal strength information and timing information involving multiple base stations is available optionally in conjunction with information from other sources, it may be rare to have a single intersecting region 340, as shown in FIG. 3.

Figure 4:
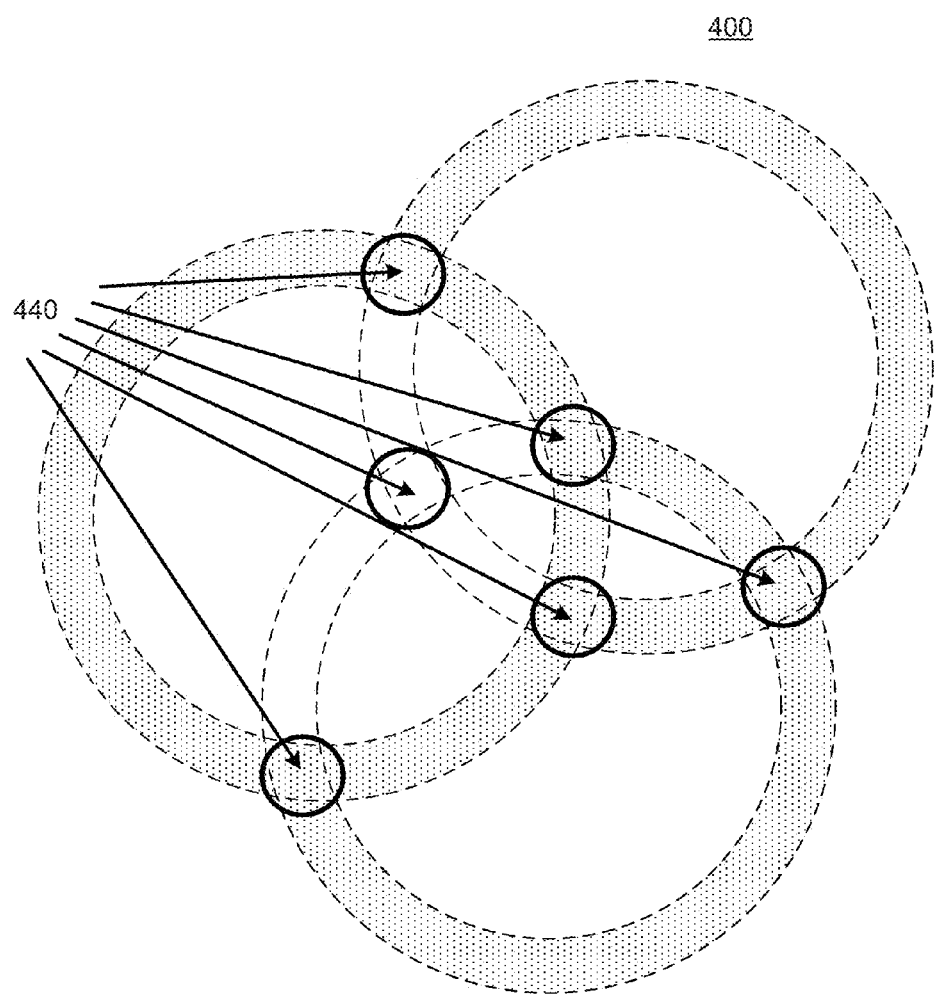
FIG. 4 illustrates a schematic diagram of potential intersecting locations for a mobile device in a geolocation system, according to another exemplary embodiment.

FIG. 4 illustrates a schematic diagram of potential intersecting locations for a mobile device in a geolocation system, according to another exemplary embodiment. In this diagram 400, there are multiple potential intersecting locations 440 that result from a more realistic compilation of measurement results from three base stations. Providing such an array of potential intersecting areas 440 may still leave a large degree of uncertainty as to where a mobile is located.

As described above, round-trip timing delay measurements may be used in a geolocation system. In addition, signal strength measurements may be used as well. Although this may take various forms, in its simplest form, "contours" of constant signal strength may be drawn in the region or vicinity of a base station site, in much the same way as the timing-based (annular) contours were shown in FIG. 1. For example, a mobile device reporting a particular signal strength or power control level and a given signal attenuation (relative to the transmit power reported by the base-station) may be judged to be at a particular distance from the base station. Thus, a greater distance may correspond to lower signal strengths and higher signal attenuation values and vice-versa. If such information is available from two or more base stations, an intersection of these contours may be used to provide one or more geolocation fixes (depending on how many base stations are detected). Although buildings, obstacles, and other signal clutter may also hinder the relationship between distance and signal strength, it should be appreciated that a relationship between signal strength and distance generally exists.

Moreover, another potential way to use signal strength may be provided. For example, the differences in signal strengths received at a mobile device from two (or more) base-stations may be utilized. This difference may also help create contours, where each contour is a path joining all of the points of equal signal strength difference between the base stations. For instance, if the difference in received signal strength is 3 dB (e.g., the signal power received from a first base station, BTS #1 is half of that received from a second base station, BTS #2), then this value can exist at a number of points between the base stations, e.g., where the signal strengths received from BTS #1 and BTS #2 may have values shown in Table 1 below:

TABLE 1

| BTS #1 | BTS #2 |
|---|---|
| −50 dBm | −53 dBm |
| −55 dBm | −58 dBm |
| −62 dBm | −65 dBm |
| . . . | . . . |
| −80 dBm | −83 dBm |

In this example, the signal strength difference between BTS #1 and BTS #2 may continue to be +3 dB, despite the fact that the absolute signal strength levels may be steadily decreasing (e.g., because the user is moving away from both base stations). If this process is extended to a large number of users and a still larger number of signal strength readings from their mobile devices (perhaps over a period of time), then contours of constant signal strength difference may be formed from these measurements (e.g., signal strength difference values measured by a plurality of mobile devices, not just the single mobile device used in the above simple example). These contours may then be used in the same way as the timing or pure signal-strength contours discussed above.

An additional embodiment may be to combine both time-delay information and signal strength information from one or more sites (as illustrated in FIGS. 2-3). In each case, information may be used to form contours upon (or within) which a mobile device could be located and where intersection(s) of these contours (e.g., a timing contour from BTS #1 and a signal-strength or attenuation-based contour from BTS #2) may yield one or more possible locations for the mobile device.

It should be appreciated that "raw" geolocation data may also be used. The nature of such geolocation techniques is that there is frequently uncertainty in the values measured (e.g., signal strengths with building clutter involved) and, in some cases, insufficient information to provide a reasonable fix (e.g., where information from only a single BTS is available). Thus, "raw" geolocation data may benefit from further processing in order to achieve an improved geolocation fix for each point during a call, session, or series of calls/sessions (e.g., for each "call segment") to help account for such uncertainties or insufficiencies.

It should be appreciated that calls and data sessions made within a mobile communications system may be broken down into individual "call segments." Segmentation of such calls and sessions would be invisible to a user, as he/she may never experience breaks or interruptions to speech during a call or data transfer during data session. A call segment may be comprised of a series of records of activity from a mobile device during which relatively little has changed (little change in signal strength or location, no change in call type (e.g. voice/data), etc). Each segment may have a single geolocation fix associated with it, largely in order to keep processing overhead and storage requirements tractable. For each call segment, the mobile device may report various pieces of information to the network. For example, a mobile device may report at least the following: (1) which base station(s) the mobile device can receive (including the base station(s) to which the mobile device is operably connected); (2) signal strength, received signal quality (or similar) measures which the mobile device is experiencing from the base station(s) it is connected to and any others it can recognize; (3) round-trip delay times experienced from one or more base stations the mobile device can recognize (typically at least a base station to which the mobile device is operably connected); (4) measurements from which the relative arrival times of signals from different base stations can be derived; (5) information reported by the mobile device regarding information collected previously for example when not connected to the network (6) identification information for the mobile device; and (7) location information obtained from another source (e.g., a GPS receiver or other similar device in which the mobile device is so-equipped), in the event that the source is turned on.

It should be appreciated that while embodiments described herein may refer to a call or call segment, such designations may more broadly refer to any of a call, a call segment, session, a series of calls/sessions, and/or fragments of call/session.

Information measured by a base station may also be provided to assist with geolocation. For instance, this may include access propagation delay information in UMTS and/or timing advance in LTE. Other network elements may also provide helpful geolocation measurement. These may include a Gateway Mobile Location Centre (GMLC), Secure User Plane Location (SUPL) Location Centre (SLC), Wi-Fi hotspots, network elements in a heterogeneous network, etc. Other various geolocation information or geolocation-derived information, from a variety of network elements or sources, may also be provided.

While the above information would, ideally, be available for all call segments, this may not always be the case. It may be possible to see timing advances reported on a periodic schedule and measurements reported at completely different times. So, in reality, call segments may have zero or more measurements, zero or more round-trip delays, zero or more GPS fixes (none if the user's GPS is turned off), etc. When none of these pieces of information are available, providing a geolocation fix may become a matter of guesswork. Accordingly, it may be even more important to provide a more specific estimated fix that may be re-aligned to a more realistic location, where such a location may be obtained by spatial interpolation between those segments on either side, which are more reliably located.

Therefore, an advantage of embodiments described herein may be to geolocate each call segment, for each user/mobile device within the network, such that the user's behavior may be tracked or observed (e.g., by a network operator) over various periods of time (e.g., duration of a call or session, span of hours, days, or weeks, etc.) as desired for producing relatively reliable results.

The call segments, thus, may represent snapshots for a duration of one or more voice call or data session or partial calls or partial data sessions, and each segment may be independently geolocated by one or more techniques described herein or one or more techniques similar to what is described herein. The result of these individual geolocations may be a set of points (location estimates) with, in some cases, multiple possible points for a single call segment. For example, if data from only a single BTS is available, then any point within the annular ring of FIG. 1 may be valid. Similarly, if both timing-based and signal-strength based methods are used independently, then this may yield two or more separate points, with limited or no indication as to which is most likely to be valid. In some embodiments, a choice of candidate points may be made based on that which is most likely given the various pieces of information that are known about the location. In many cases, a random choice must be made. It should be appreciated that rather than a discrete point, a geolocation "fix" or "point" as described herein may be an estimate associated with a general or specific space, area, or volume that bounds the geographic uncertainty for each call segment, which in turn may also be associated with a uniform or varying probability of occurrence of the segment. It should be appreciated that the candidate points may be generated by applying a sampling function to these geographic areas or volumes. However, applications that deal directly with areas or volumes with uniform or non-uniform probability distribution of segment occurrence may be seen as a natural extension of the approach to deal with candidate points.

These points may be "smoothed," for example, by applying a low-pass filtering technique to the data, or by some other statistical/smoothing techniques, or by some combination of multiple statistical/smoothing techniques. Such smoothing may result in a better (on average) fix for each point (call segment). Although results are not perfect, it may be able to reduce the impact of outlying data (e.g., one or more points within the annular ring of FIGS. 1-4 that are chosen at random), which may tend to skew overall results and degrade the quality of otherwise accurate fixes. Thus, applying one or more smoothing techniques may help achieve a more significant improvement in geolocation accuracy. Other various processing techniques may also be provided.

Figure 5:
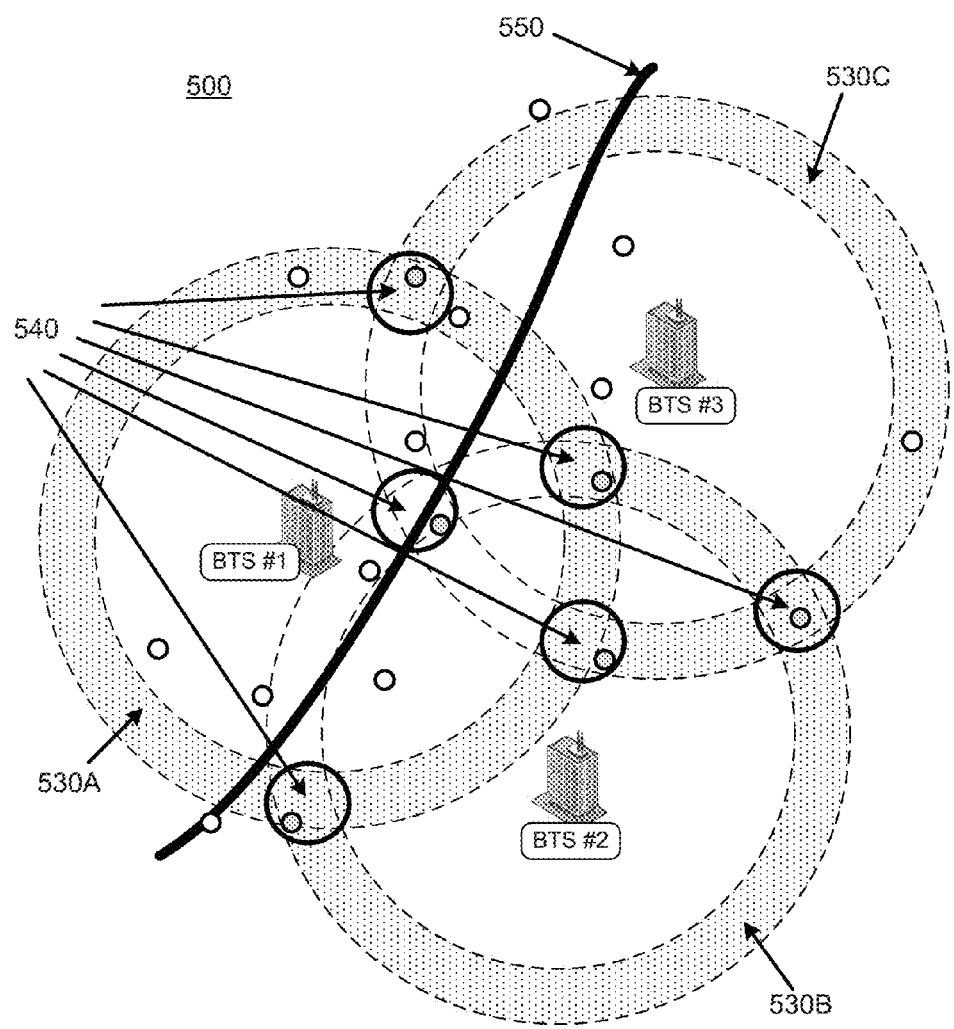
FIG. 5 illustrates a schematic diagram of possible locations for a mobile device in a geolocation system utilizing smoothing and post-smoothing analysis, according to an exemplary embodiment.

FIG. 5 illustrates a schematic diagram of possible locations for a mobile device in a geolocation system utilizing smoothing and post-smoothing analysis, according to an exemplary embodiment. Similar to FIG. 3, diagram 500 of FIG. 5 depicts three base stations. In this configuration, timing information may be available from a first base station BTS #1 (similar to BTS #1 of FIGS. 1-2) and approximate signal-strength-based contours may be available from a second base station BTS #2 and a third base station BTS #3, each of which produces a contour or annular ring 530A, 530B, and 530C, respectively, as described above, having intersecting regions 540. In the context of segment geolocation being defined by areas and probabilities, smoothing may be regarded as modification of the boundaries of such areas, variation of the probability distribution within such areas or both.

In some embodiments, geolocation fixes corresponding to the progress of one or more calls or data sessions may be depicted as white and gray dots, which may represent each call segment within the current call/session. Based on contours 530A, 530B, and 530C measured by a mobile device at that particular point in time, there may be various intersecting regions 540. Thus, all geolocated possible locations (all dots) may be narrowed to a fewer grouping of particular points under consideration (gray dots), as indicated by the circles highlighting the overlapping intersecting regions 540. It should be appreciated that no single area of overlap satisfies all of the measured data and hence a large number of possible (and equally-likely) locations may still exist. Accordingly, line 550 may represent locations subject to one or more filtering/smoothing techniques. For example, these location points would, in effect, be moved to correspond with this line (although this step is not shown in FIG. 5). Once smoothing has been undertaken, a multiple pass geolocation process, as described herein, may be employed to help pinpoint the location that is most likely to be correct. On this basis, it may also be possible to then deduce that this point is inconsistent with the measurements from BTS #1 and more consistent with the measurements from BTS #2 and BTS #3. It may therefore be possible to designate the measurements from BTS #1 as inconsistent, perhaps due to noise, non-line of sight propagation, or for some other reason, and thus eliminate it from the data used for geolocation. In other words, each point may be designated a different likelihood but many points may be designated relatively similar likelihoods and be difficult to distinguish. As a result, processing the information using smoothing or other similar techniques in a multiple pass geolocation system may help distinguish and separate out these possibilities by how well they are described by the smoothed analysis.

Figure 6A:
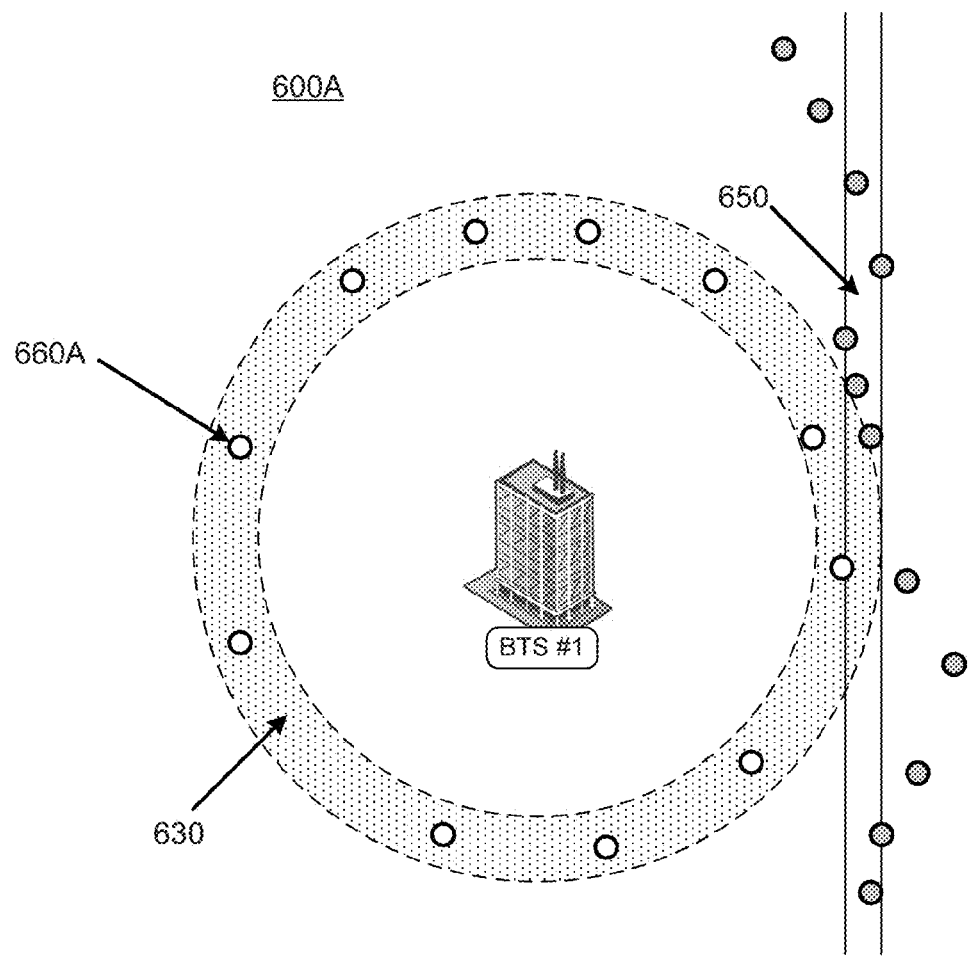
FIGS. 6A-6B illustrate schematic diagrams of refined potential locations for a mobile device in a multiple pass geolocation system, according to an exemplary embodiment.
Figure 6B:
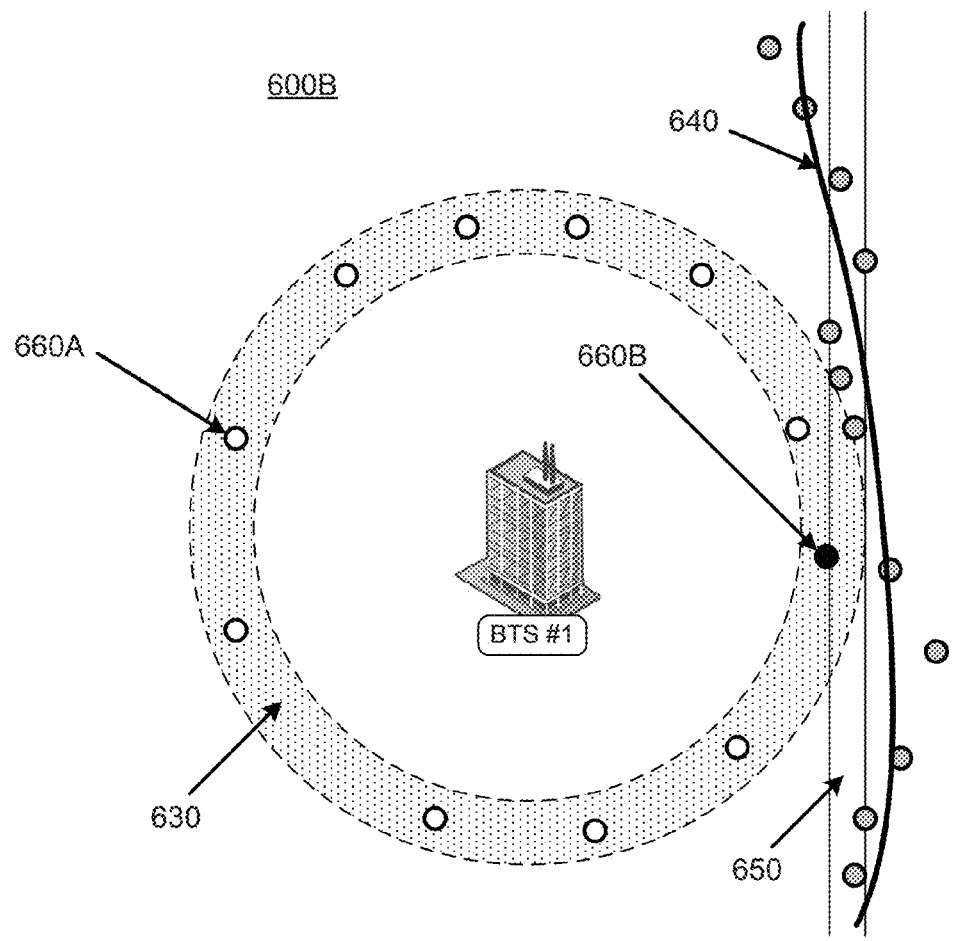

FIGS. 6A-6B illustrate schematic diagrams of refined potential locations for a mobile device in a multiple pass geolocation system, according to an exemplary embodiment. Referring to FIG. 6A, diagram 600A depicts a single base station BTS #1 having a contour 630 in an annular ring shape based on round-trip time-delay measurements and/or signal strength measurements, as described above. In diagram 600A, there are a number of equally-valid locations (white dots) for a mobile device within the contour 630 of BTS #1. Although the progress of one or more calls or sessions in terms of the geolocation fixes (gray dots) may be identified along a road 650, where each of these gray dots may represent each call segment within the calls/sessions, one particular call segment 660A may be chosen at random as the subject of further analysis or consideration as the potential location of the mobile device.

The particular location 660A, which may be chosen at random for the call segment, may clearly be invalid to the human eye in this diagram, especially in light of immediately-prior and/or immediately-subsequent locations of the mobile device along the road 650 and based upon the earlier and/or later call segments from the same call. With current geolocation techniques, however, such random choices results in frequent mistakes since current techniques may not explicitly take into account the immediately surrounding call segments in coming to a decision about the most likely location (from a locus of possible locations) for a given call segment.

Referring to FIG. 6B, diagram 600B depicts a multiple pass geolocation system that utilizes smoothing and post-smoothing analysis to refine the geolocation fix. Instead of randomly choosing any of the possible locations within the contour area 630, the multiple pass geolocation system depicted in FIG. 6B may be capable of using smoothing and post-smoothing analysis together with the techniques mentioned herein, to refine the location estimate. Using this process, it may be determined that the black dot 660B, rather than the white dot 660A selected in the first pass, for example, is the most likely candidate for the geolocation/position fix for the call segment. Thus, an improved technique to geolocate a mobile device may be provided. It should be appreciated that FIGS. 6A-6B may provide a simplified example, applying these processing techniques in a multiple pass geolocation system may be implemented in more complicated scenarios to more accurately geolocate one or more mobile devices.

Figure 7:
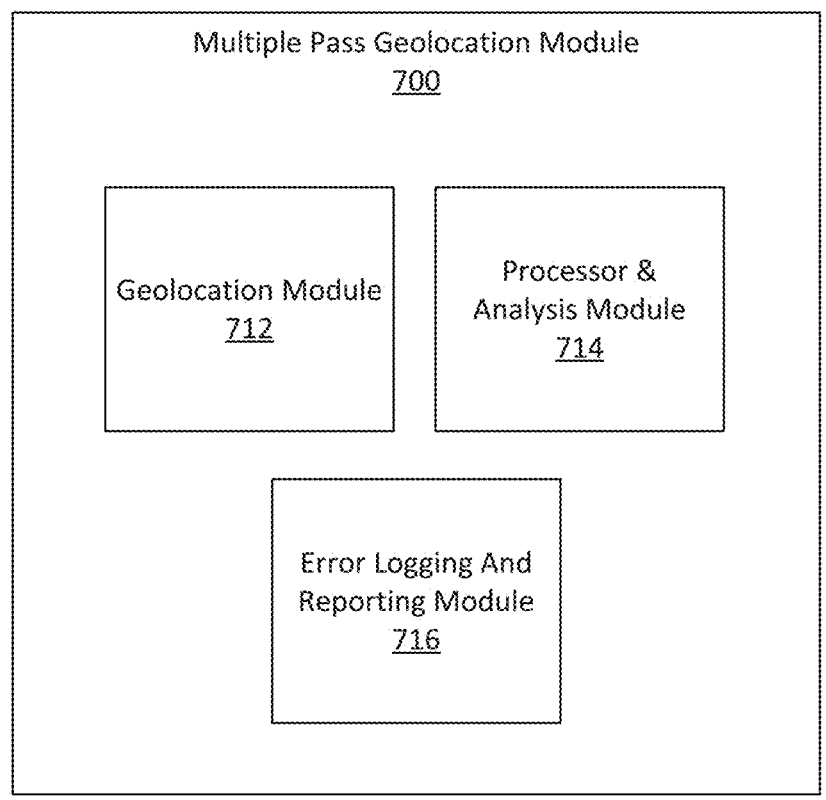
FIG. 7 illustrates a multiple pass geolocation module, according to an exemplary embodiment.

FIG. 7 illustrates a multiple pass geolocation module, according to an exemplary embodiment. Referring to FIG. 7, there is shown a multiple pass geolocation module 710 in accordance with an embodiment of the present disclosure. As illustrated, the multiple pass geolocation module 710 may contain one or more components including geolocation module 712, processor and analysis module 714, and error logging and reporting module 716.

The description below describes network elements, computers, and/or components of a system and method for multiple pass geolocation that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Geolocation module 712 may be used to determine geolocation or geolocation-derived data associated with a mobile device. For example, such information may include, but not be limited to, round-trip time-delay measurements, signal strength measurements, or other geolocation or geolocation-derived data. Furthermore, this information may be used in conjunction with satellite-based navigational measurements, such as GPS (Global Positioning System), GLONASS (Global Navigation Satellite System), Galileo (European-based satellite navigation), or other similar data.

It should be appreciated that the geolocation module 712 may perform one or more geolocation techniques in accordance with embodiments described herein and/or at least the following: U.S. Patent Publication No. 2011/0319093 to Flanagan, entitled "Geo-location in a Wireless Communication Network," filed on Sep. 19, 2011 and published on Dec. 29, 2011; U.S. Pat. No. 8,374,596 to Thiel et al., entitled "Method and Apparatus for Deriving Pathloss Estimation Values," filed on Dec. 21, 2009 and issued on February 2013; U.S. Patent Publication No. 2013/0210450 to Kenington et al., entitled "Method and Apparatus for Geolocating Wireless Communication Unit," filed on Feb. 9, 2012 and published on Aug. 1, 2013; U.S. Patent Publication No. 2013/0210449 to Flanagan, entitled "Mobile Geolocation," filed on Sep. 19, 2011 Feb. 9, 2012 and published on Aug. 1, 2013; U.S. Patent Publication No. 2014/0171102 to Murphy et al., entitled "Mobile Geolocation," filed on Dec. 18, 2012 and published on Jun. 19, 2014; and U.S. Patent Publication No. 2014/0171103 to Murphy et al., entitled "Method and System for Mobile Reference Signature Generation," filed on Dec. 18, 2012 and published on Jun. 19, 2014, all of which are herein incorporated by reference in their entireties. It should be appreciated that such information and data may be transmitted and/or received in real-time, near real-time, or from historical storage units. For example, a mobile device may send a radio link failure report (RLF) that contains information about an event in the past where the mobile device lost service. Such information may not immediately be reported or may be stored for future retrieval/transmission.

Processor and analysis module 714 may be used to processing all (or a subset) of the chosen estimates for all (or the subset of) call segments of the plurality of call segments to identify one or more geolocation estimates under consideration. In some embodiments, this may entail performing one or more smoothing and/or post-smoothing techniques, as described herein. The processor and analysis module 714 may also facilitate comparisons of the plurality of potential candidate locations with results from the smoothing analysis, and help identify discrepancies. For example, if such discrepancies meet a predefined discrepancy threshold, the one or more geolocation estimates under consideration may be identified. The processor and analysis module 714 may then choose to discard, disregard, or otherwise relegate less important these potential candidate locations that are associated with the identified discrepancies. The processor and analysis module 714, upon multiple geolocation passes, may be used to further refine the one or more geolocation estimates under consideration to ultimately improve geolocating one or more mobile devices within a network.

Error logging and reporting module 718 may produce logs, reports, or other information associated with improving allocation of network resources using geolocation and handover management. It should be appreciated that any or all of these modules 310-318 may be communicatively coupled to one or more databases or storage/memory units (not shown), locally or remotely, so that information may be stored for later use or processing.

Figure 8:
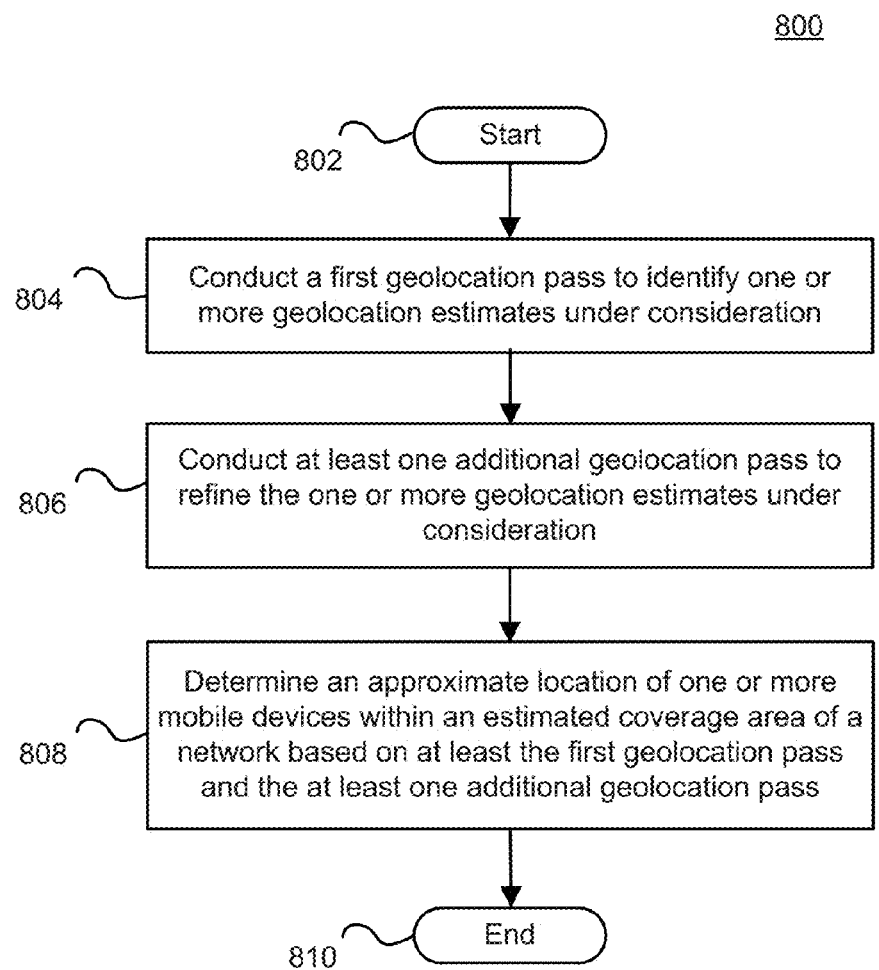
FIG. 8 illustrates a flowchart of a method for multiple pass geolocation, according to an exemplary embodiment.

FIG. 8 illustrates a flowchart of a method for multiple pass geolocation, according to an exemplary embodiment. The exemplary method 800 is provided by way of example, as there are a variety of ways to carry out methods disclosed herein. The method 800 shown in FIG. 8 may be executed or otherwise performed by one or a combination of various systems. The method 800 is described below as carried out by at least the systems, configurations, diagrams, schematics, and modules in FIGS. 1-7, by way of example, and various elements of module 700 are referenced in explaining the exemplary method of FIG. 8. Each block shown in FIG. 8 represents one or more processes, methods, or subroutines carried out in the exemplary method 800. A non-transitory computer-readable medium comprising code, which when performed by a computer may perform the acts of the method 800 may also be provided. Referring to FIG. 8, the exemplary method 800 may begin at block 802.

At block 804, a first geolocation pass may be conducted. For example, at least the geolocation module 712 may conduct a first geolocation pass to identify one or more geolocation estimates under consideration. In some embodiments, conducting the first geolocation pass may comprise locating a call segment of a plurality of call segments to identify a plurality of potential candidate locations for a mobile device within a network. Locating the call segment may comprise at least geolocating the call segment using round-trip time delay measurements, time difference information, signal strength based measurements, satellite-based navigational measurements, or a combination thereof. It should be appreciated that satellite-based navigational measurements may be based on GPS (Global Positioning System), GLONASS (Global Navigation Satellite System), Galileo (European-based satellite navigation), or other similar systems. Other various measurements may also be utilized.

It should be appreciated that it may be possible for some call segments/sessions to yield multiple candidates but others only one. An example would be that the mobile device may be served for part of the calls/sessions by a femto cell with extremely localised coverage such that it essentially has to be located at that cell.

In the first geolocation pass, one estimate from the plurality of potential candidate locations for the call segment may be chosen. In some embodiments, choosing one estimate from the plurality of potential candidate locations may be based on: a random choice, a choice based on a confidence score associated with the one estimate, or other decision mechanism, or a combination thereof.

It should be appreciated that the locating and the choosing actions for each call segment of the plurality of call segments may be repeated. In some embodiments, rather than repeating, the plurality of potential candidate locations and the choosing actions for each call segment of the plurality of call segments may be reassessed.

Conducting the first geolocation pass may also comprise processing all (or a subset) of the chosen estimates for all (or the subset of) call segments of the plurality of call segments to identify one or more geolocation estimates under consideration. For example, at least the processor and analysis module 714 may process all (or a subset) of the chosen estimates for all (or the subset of) call segments of the plurality of call segments to identify one or more geolocation estimates under consideration. In some embodiments, this may entail performing a smoothing analysis on a subset or all the chosen estimates for all call segments of the plurality of call segments. Furthermore, the plurality of potential candidate locations may be compared against results from the smoothing analysis. This may help identify discrepancies. For example, if such discrepancies meet a predefined discrepancy threshold, it may be determined, the one or more geolocation estimates under consideration may be identified. The potential candidate locations that are associated with the identified discrepancies may then be discarded or be made less important for further processing.

At block 806, at least one additional geolocation pass may be conducted. For example, at least the geolocation module 712 may conduct at least one additional geolocation pass to refine one or more geolocation estimates under consideration. In some embodiments, conducting the at least one additional geolocation pass may comprise locating again the call segment of a plurality of call segments. In some embodiments, conducting the at least one additional geolocation pass may comprise recalling the call segment of a plurality of call segments from the first geolocation pass. In either example, a plurality of potential candidate locations for a mobile device within a network may be identified.

In the at least one additional geolocation pass, one estimate from the plurality of potential candidate locations for the call segment may be chosen. In some embodiments, choosing one estimate from the plurality of potential candidate locations may be based on selecting the one estimate which is most consistent with the smoothing analysis for that call segment. In some embodiments, choosing one estimate from the plurality of potential candidate locations may be based assigning a confidence score to each potential candidate estimate, wherein the confidence score is based at least in part on results of the smoothed analysis for that call segment.

Similar to the first geolocation pass, it should be appreciated that the locating and the choosing actions for each call segment of the plurality of call segments in the at least one additional geolocation pass may also be repeated. In some embodiments, rather than repeating, the plurality of potential candidate locations and the choosing actions for each call segment of the plurality of call segments may be reassessed.

Conducting the at least one additional geolocation pass may also comprise processing all (or a subset) of the chosen estimates for all (or the subset of) call segments of the plurality of call segments to identify one or more geolocation estimates under consideration. For example, at least the processor and analysis module 714 may process all (or a subset) of the chosen estimates for all (or the subset of) call segments of the plurality of call segments to refine the one or more geolocation estimates under consideration. In some embodiments, this may entail performing additional smoothing analysis of all the chosen estimates for all call segments of the plurality of call segments for the at least one additional geolocation pass. Furthermore, similar to the first geolocation pass, the plurality of potential candidate locations may be compared against results from the smoothing analysis. This may help identify discrepancies. For example, if such discrepancies meet a predefined discrepancy threshold, these one or more geolocation estimates under consideration may be identified. The potential candidate locations that are associated with the identified discrepancies may then be discarded or be made less important for in further processing.

At block 808, an approximate location of one or more mobile devices within an estimated coverage area of a network may be determined based on at least the first geolocation pass and the at least one additional geolocation pass. It should be appreciated that while the at least one additional geolocation pass may be any number of additional passes. Each repetition may generally achieve improvement in accuracy (at the expense of an increase in computation time and hence a delay in reporting a geolocation fix/location of one or more mobile devices).

At block 810, the method 800 may end.

Figure 9A:
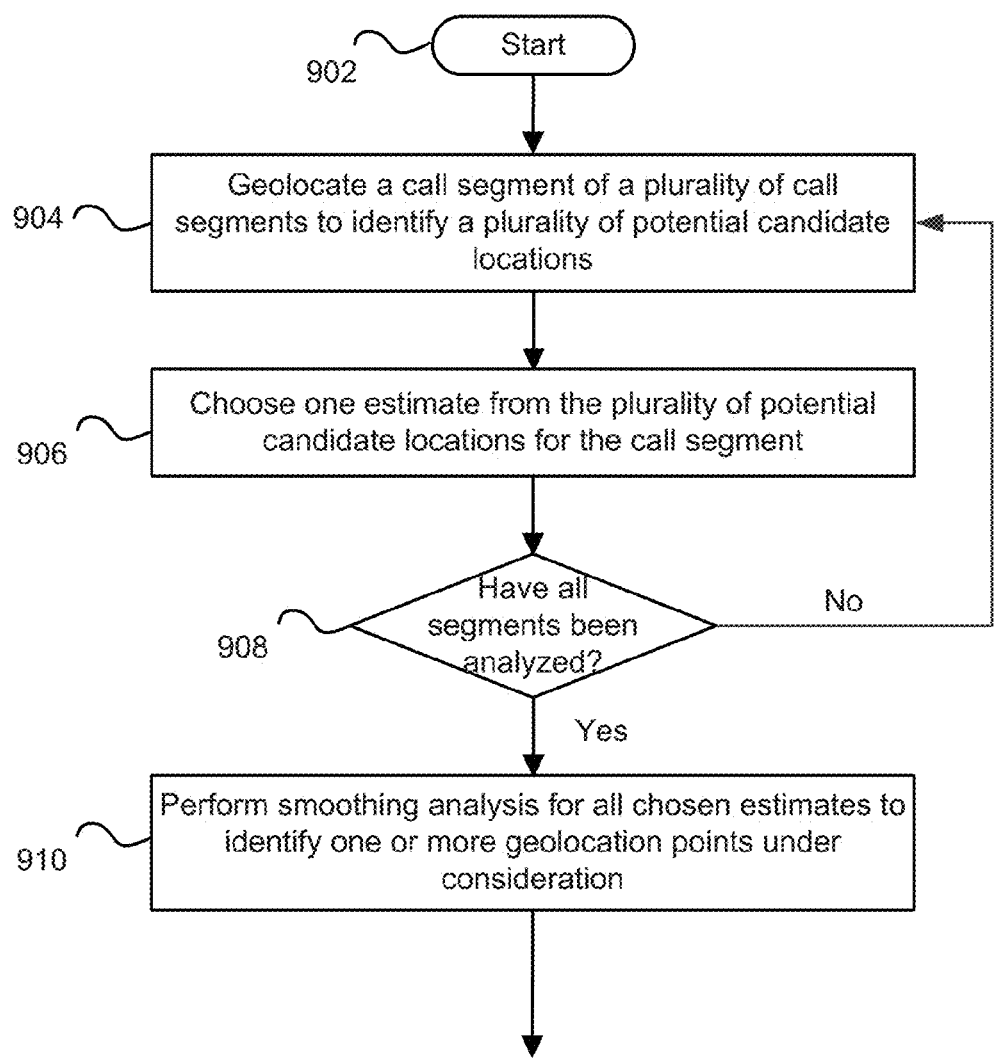
FIGS. 9A-9B illustrate a flowchart of a method for multiple pass geolocation, according to an exemplary embodiment.
Figure 9B:
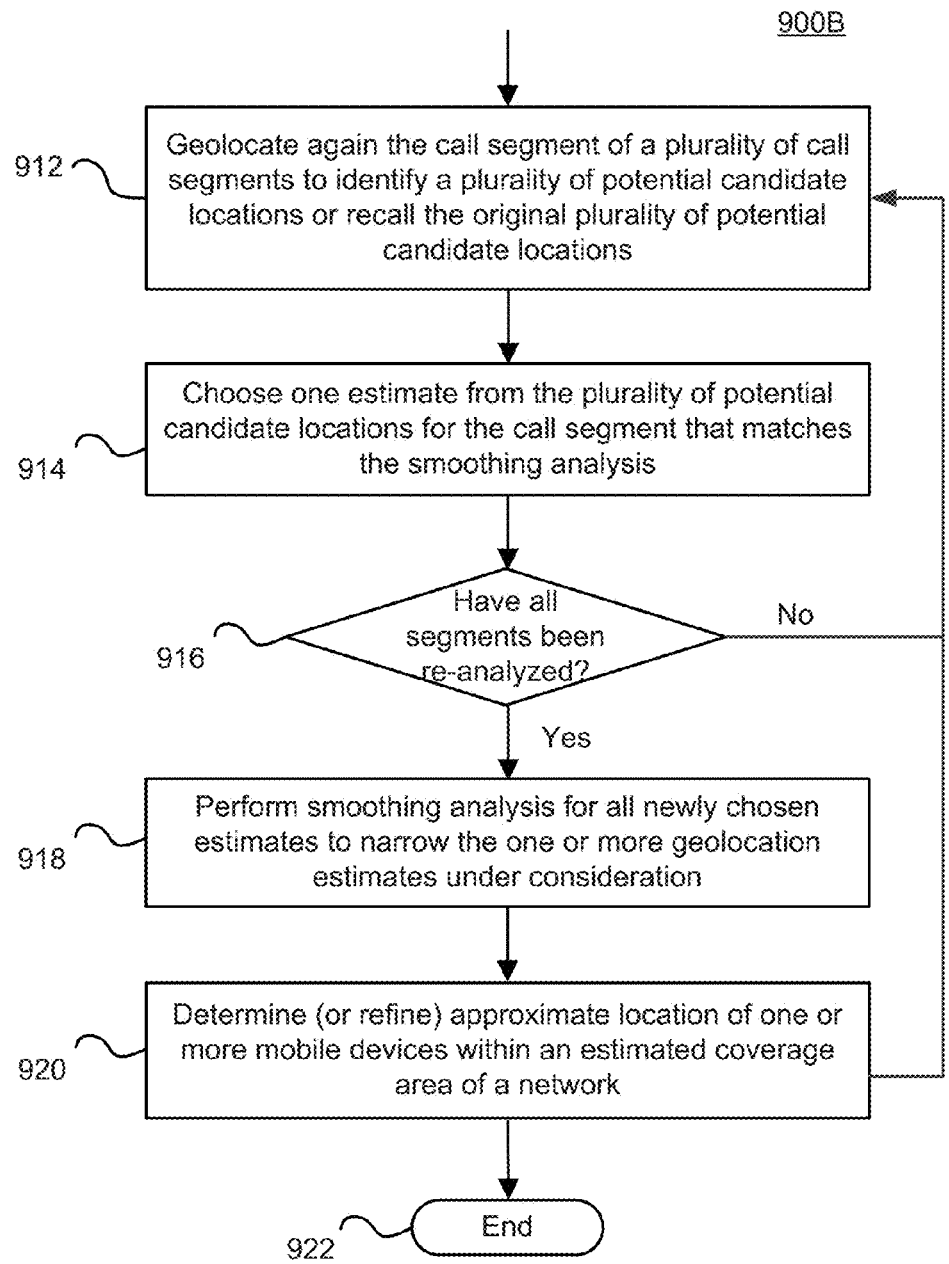

FIGS. 9A-9B illustrate a flowchart of a method for multiple pass geolocation, according to an exemplary embodiment. The exemplary methods 900A and 900B is provided by way of example, as there are a variety of ways to carry out methods disclosed herein. The methods 900A and 900B shown in FIGS. 9A-9B may be executed or otherwise performed by one or a combination of various systems. The methods 900A and 900B is described below as carried out by at least the systems, configurations, diagrams, schematics, and modules in FIGS. 1-7, by way of example, and various elements of module 700 are referenced in explaining the exemplary method of FIGS. 9A-9B. Each block shown in FIG. 9A-9B represents one or more processes, methods, or subroutines carried out in the exemplary methods 900A and 900B. A non-transitory computer-readable medium comprising code, which when performed by a computer may perform the acts of the methods 900A and 900B may also be provided. Referring to FIGS. 9A-9B, the exemplary methods 900A and 900B may begin at block 902.

At block 904, a call segment of a plurality of call segments may be geolocated, for example, by the geolocation module 712, to identify a plurality of potential candidate locations. As discussed above, geolocating the call segment may be based on round-trip time delay measurements, time difference information, signal strength based measurements, satellite-based navigational measurements, or a combination thereof.

At block 906, one estimate from the plurality of potential candidate locations for the call segment may be chosen. As discussed above, this choice may be random or may be based upon a confidence score associated with the candidate estimate. Other appropriate mechanisms may also be provided.

At block 908, it may be determined whether all segments designated for analysis have been analyzed. If not, then blocks 904 and 906 may be repeated as necessary. If yes, the method 900 may proceed to the next step.

At block 910, a smoothing analysis may be performed, for example, by the processor and analysis module 714, for all chosen estimates. This process may result in the locations for some or all of the call segments to be modified, such that they are more closely aligned, e.g., on a particular "path," which ultimately may help identify one or more geolocation estimates under consideration. Further processing may also occur. For example, as described above, each component of mobile device inputs used for geolocation of a given segment may be examined and processed. Each of these components, such as the round trip delay, the area derived from GPS, etc., may be compared to the smoothed location for that segment and considered for plausibility. Where there is a large discrepancy between the smoothed location and a component of the inputs used for geolocation, then that component may rejected, weighted less heavily, and/or determined to be unhelpful in geolocation. It should be appreciated that this block may be repeated for all geolocation estimates under consideration by the algorithm At block 912, an additional geolocation pass may commence. In particular, at block 912, a call segment of a plurality of call segments may be geolocated (again), for example, by the geolocation module 712, to identify a plurality of potential candidate locations. Alternatively, the original plurality of potential candidate locations may be recalled.

At block 914, one estimate from the plurality of potential candidate locations for the call segment that matches the smoothing analysis may be chosen. In other words, this may involve re-examining the candidate locations, in the light of the smoothed data generated above, and picking the candidate location which also matches this smoothed data. For example, a candidate estimate that lies closest to the smoothed location for that segment may be chosen. In some embodiments, as described above, an alternative method may be provided that involves assigning a confidence score to each candidate estimate, where the confidence score is dependent on how well that candidate estimate is described by the available data, and arranging for the confidence score to include a component based on the proximity of that candidate estimate to the smoothed location, for that segment.

At block 916, it may be determined whether all segments designated for reanalysis have been reanalyzed. If not, then blocks 912 and 914 may be repeated as necessary. If yes, the method 900B may proceed to the next step At block 918, smoothing analysis may be performed, for example, by the processor and analysis module 714, for all newly chosen estimates from block 914. This may help narrow the one or more geolocation estimates under consideration.

At block 920, an approximate location of one or more mobile devices within an estimated coverage area of network may be determined or refined.

At block 922, the method 900 may end. It should be appreciated that while methods 900A-900B only describe two geolocation passes, the second pass beginning at block 912 may be repeated multiple times as necessary. Each repetition may generally achieve improvement in accuracy (at the expense of an increase in computation time and hence a delay in reporting a geolocation fix/location of one or more mobile devices).

For example, in some embodiments, if two geolocation passes have already taken place on some call segments for a mobile device and processing (e.g., smoothing or other technique) has been provided for these call segments, there may be some new call segments for this mobile device that have not yet been geolocated (perhaps due to transpired time periods). In this scenario, further smoothing or additional processing may be applied as described above. Other various implementations may also be provided.

For instance, in some embodiments, processing the new, not-yet-geolocated call segments may involve: (1) generating candidate estimates for the new call segments and either choose the best or a random one as normal; (2) performing smoothing technique on the combined set of segments as follows: (a) the already fully geolocated segments, and (b) the candidate estimate just chosen for each segment; and (3) using this smoothed output for further stages of geolocation (e.g., revisiting candidate estimates and choosing the most likely, which is possibly different from the one chosen the first time around). It should be appreciated that the previously geolocated segments may take no further part in the algorithm and may not be adjusted or changed in any way. These segments may be used, for example, as an input to improve the geolocation for the newer not-yet-geolocated segments. Such an overall approach may be particularly useful in real-time or near real-time geolocation scenarios to provide greater efficiency in processing.

It should be appreciated that the techniques described herein may provide improvement in geolocation accuracy for mobile devices, relative to conventional coverage patterns, which are based upon reported BTS locations.

While embodiments may be based upon round-trip time delay measurements or signal strength based contours for which mobile devices are located, it should be appreciated that contours or shapes created based on other techniques may also be provided. For example, GPS-based measurements may provide helpful information and/or shapes to locate mobile devices.

An advantage of the techniques described herein is that while an approximate location may be obtained by selecting at random from a range of possible locations, a more refined approximation may be made in one or more subsequent geolocation passes. Further, the use of processing techniques such as smoothing or post-smoothing analysis may provide greater location approximation accuracy.

It should be appreciated that base stations or BTS, as described herein, may include radio transceivers that define a cell and may coordinate radio-link protocols with mobile devices. A base station may also provide a networking component of a mobile communications system from which signals are sent and received. A base station may be controlled and monitored by one or more Base Station Controllers (BSC) to provide communication over a network. The network may be the Internet or one or more other networks utilized for connecting various network providers and/or clients and allow for mobile communications between various mobile communications devices. As described above, a base station may comprise configuration parameters that control various aspects of a cell site, where each of these parameters may be altered to change network behavior, based on observations of both the base station itself, measurements at the mobile station or handset, or other acquired or generated data. In addition, a base station may include a small cell, such as a femtocell, picocell, microcells, or other device that uses distributed radio technology to enhance network coverage area.

Mobile devices, as described herein, may include a variety of communications systems and/or devices. For example, such systems and/or devices may include desktop computers, laptops/notebooks, tablets, personal digital assistants (PDA), smart phones, wireline phones, cellular phones, mobile phones, satellite phones, MP3 players, video players, personal media players, personal video recorders (PVR), watches, gaming consoles/devices, navigation devices, televisions, printers, fitness devices, medical devices, and/or other devices capable of receiving and/or transmitting signals. It should be appreciated that a mobile devices 110A-110G may be used independently or may be used as an integrated component in another device and/or system (e.g., an automobile).

It should be appreciated that a base station, as described herein, may be connected to a variety of other backend systems. In order for the systems, configurations, and modules, as described herein, to provide various services to its subscribers, a base station via the BSC may be communicatively coupled to one or more servers which in turn may access a variety of databases. These databases may store a variety of information. For example, the databases may store information that identifies subscribers using its service and for which service features are subscribed. The databases may store information, such as a subscriber's customer name, identification number, services, or other identifiers, and/or whether a user's mobile devices is switched on or off. It should be appreciated that these databases may be highly robust and may further store geolocation information, geolocation-derived information, and other information suitable for estimating a coverage area for a DAS or repeater system.

It should be appreciated that the contents of these databases may be combined into fewer or greater numbers of databases and may be stored on one or more data storage systems and in more than one formats. The data storage systems may be local, remote, or a combination thereof to clients systems, servers, and/or other network components. Information stored in the databases may be useful in, for example, locating a mobile device within a coverage area, and/or other related services.

Communication between the various base stations, mobile devices, service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE), Voice over LTE (VoLTE). Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11 ac, etc., or via protocols for a wired connection, such as an IEEE Ethernet 802.3.

By utilizing a multiple pass geolocation approach, a more reliable way to geolocate mobile devices within wireless telecommunication networks may be achieved.

In addition to the benefits described above, embodiments of the system and method for multiple pass geolocation not only provide an effective and improved technique for locating mobile devices in such systems, but also may allow service providers the ability to provide better service to a larger subscriber pool since. Moreover, advantages in network optimization may also be apparent. Providing such a technique for better locating mobile devices within a telecommunication network may maximize network resource allocation if the locations of mobile devices are more accurately tracked. Furthermore, advertisement and marketing opportunities may also be available. With knowledge of a user's location, more relevant advertisements and other commercial information may also be presented to one or more subscribers.

While the features and functionalities for estimating a coverage area for multiple pass geolocation are primarily discussed with respect to the embodiments above, it should be appreciated that the features and functionalities of one embodiment may be similarly applied to other embodiments. Furthermore, although the embodiments described above do not require the use of GPS technology or other location services, it may be readily appreciated that the features and functionalities described herein may be used in conjunction with GPS or other location-based technologies as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that estimating a mobile device location in a multiple pass geolocation system in accordance with the present disclosure as described above typically involves the processing of input data and the generation of output data to some extent. This input data processing and output data generation may be implemented in hardware or software. For example, specific electronic components may be employed in a coverage area estimation module or similar or related circuitry for implementing the functions associated with for multiple pass geolocation in accordance with embodiments described above. Alternatively, one or more processors operating in accordance with instructions may implement the functions associated with for multiple pass geolocation in accordance with embodiments as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
conducting, by a device, a first geolocation pass to identify one or more geolocation estimates,
the conducting the first geolocation pass comprising:
performing a smoothing analysis on at least one of the one or more geolocation estimates for a plurality of call segments,
the plurality of call segments being segments of one or more calls or data sessions associated with a mobile communications system,
comparing a plurality of potential candidate locations against results of the smoothing analysis,
identifying one or more discrepancies based on comparing the plurality of potential candidate locations against the results of the smoothing analysis,
identifying at least one location that is associated with the one or more discrepancies, and
one of:
discarding the at least one location based on identifying the at least one location, or
associating, based on identifying the at least one location, the at least one location with less importance for further processing during at least a second geolocation pass than one or more other locations from the one or more geolocation estimates;
conducting, by the device, the second geolocation pass to refine the one or more geolocation estimates; and
determining, by the device, an approximate location, of a mobile device, based on the one or more geolocation estimates and after conducting the first geolocation pass and the second geolocation pass.

2. The method of claim 1, wherein conducting the first geolocation pass comprises:
locating a call segment of the plurality of call segments; and
choosing, for the call segment, an estimate, of the one or more geolocation estimates, from the plurality of potential candidate locations.

3. The method of claim 2, wherein locating the call segment comprises geo locating the call segment using one or more of round-trip time delay measurements, time difference information, signal strength based measurements, or satellite-based navigational measurements.

4. The method of claim 2, wherein choosing the estimate is based on one or more of a random choice or a confidence score associated with the estimate.

5. The method of claim 1, wherein conducting the first geolocation pass further comprises:
processing chosen estimates for all call segments of the plurality of call segments.

6. The method of claim 1, wherein conducting the first geolocation pass comprises:
performing additional smoothing analysis on a subset or all of the one or more geolocation estimates.

7. The method of claim 6, wherein conducting the second geolocation pass further comprises:
identifying, based on the additional smoothing analysis, one or more other discrepancies that satisfy a discrepancy threshold; and
refining the one or more geolocation estimates by discarding particular candidate locations, from the one or more of the geolocation estimates, that are associated with the one or more other discrepancies.

8. The method of claim 1, wherein conducting the second geolocation pass comprises:
recalling a call segment, of the plurality of call segments, from the first geolocation pass; and
choosing, for the call segment, an estimate of the one or more geolocation estimates.

9. The method of claim 2, wherein choosing the estimate comprises:
selecting an estimate, which is most consistent with another smoothing analysis, as the estimate.

10. The method of claim 8, wherein choosing the estimate comprises:
assigning a confidence score to a potential candidate point corresponding to the estimate, and
choosing the estimate based on the confidence score.

11. The method of claim 1, wherein conducting the second geolocation pass comprises:
performing another smoothing analysis of the one or more geolocation estimates; and
refining the one or more geolocation estimates based on the other smoothing analysis.

12. A system comprising:
one or more processors configured to:
conduct a first geolocation pass to identify one or more geolocation estimates,
the one or more processors, when conducting the first geolocation pass, are configured to:
perform a smoothing analysis on at least one of the one or more geolocation estimates for a plurality of call segments,
the plurality of call segments being segments of one or more calls or data sessions associated with a mobile communications system,
compare a plurality of potential candidate locations against results of the smoothing analysis,
identify one or more discrepancies based on comparing the plurality of potential candidate locations against the results of the smoothing analysis,
identify at least one location that is associated with the one or more discrepancies, and
one of:
discard the at least one location based on identifying the at least one location, or
associate, based on identifying the at least one location, the at least one location, with less importance for further processing during a second geolocation pass than one or more other locations from the one or more geolocation estimates;
conduct the second geolocation pass to refine the one or more geolocation estimates; and
determine an approximate location, of one or more mobile devices within an estimated coverage area of a network, based on the one or more geolocation estimates and after conducting the first geolocation pass and the second geolocation pass.

13. The system of claim 12, wherein, when conducting the first geolocation pass, the one or more processors are configured to:
locate a call segment of the plurality of call segments; and
choose, for the call segment, an estimate, of the one or more geolocation estimates, from the plurality of potential candidate locations.

14. The system of claim 13, wherein, when locating the call segment, the one or more processors are configured to:
geo locate the call segment using one or more of round-trip time delay measurements, time difference information, signal strength based measurements, or satellite-based navigational measurements.

15. The system of claim 13, wherein the estimate is chosen at random.

16. The system of claim 13, wherein, when performing the smoothing analysis, the one or more processors are configured to:
perform the smoothing analysis on each one of the one or more geolocation estimates.

17. The system of claim 13, wherein the one or more discrepancies satisfy a predefined discrepancy threshold.

18. The system of claim 12, wherein, when conducting the second geolocation pass, the one or more processors are configured to:
recall a call segment from the first geolocation pass; and
choose, for the call segment, an estimate, of the one or more geolocation estimates, from the plurality of potential candidate locations.

19. The system of claim 18, wherein, when choosing the estimate, the one or more processors are configured to:
select the estimate which is most consistent with a smoothing analysis for the recalled call segment.

20. The system of claim 18, wherein, when choosing the estimate, the one or more processors are configured to:
assign a confidence score to a potential candidate point corresponding to the estimate, and
choose the estimate based on the confidence score.

21. The system of claim 13, wherein, when conducting the second geolocation pass, the one or more processors are configured to:
perform another smoothing analysis of the one or more geolocation estimates;
identify, based on the other smoothing analysis, one or more other discrepancies that satisfy a predefined discrepancy threshold; and
refine the one or more geolocation estimates by discarding potential candidate locations, of the plurality of potential candidate locations, that are associated with the one or more other discrepancies.

22. A non-transitory computer-readable storage medium storing instructions, the instructions comprising:
one or more instructions that, when executed by at least one processor cause the at least one processor to:
conduct a first geolocation pass to identify one or more geolocation estimates,
the first geolocation pass comprising:
a smoothing analysis performed on at least one of the one or more geolocation estimates for a plurality of call segments,
the plurality of call segments being segments of one or more calls or data sessions associated with a mobile communications system,
a plurality of potential candidate locations compared against results of the smoothing analysis,
one or more discrepancies identified based on the plurality of potential candidate locations being compared against the results of the smoothing analysis,
at least one location identified that is associated with the one or more discrepancies, and
one of:
the at least one location discarded based on identifying the at least one location, or
the at least one location associated with less importance for further processing during at least a second geolocation pass than one or more other locations from the one or more geolocation estimates;
conduct the second geolocation pass to refine the one or more geolocation estimates; and
determine an approximate location of a mobile device based on the one or more geolocation estimates and after conducting the first geolocation pass and the second geolocation pass.

23. The non-transitory computer-readable storage medium of claim 22, where the approximate location is within a first angular circle of a first base station and within a second angular circle of a second base station.

* * * * *